***

US010086251B2

(12) United States Patent
Allen et al.

(10) Patent No.: US 10,086,251 B2
(45) Date of Patent: Oct. 2, 2018

(54) SYSTEMS AND METHODS FOR DETERMINING PENALTIES

(71) Applicant: Elwha LLC, Bellevue, WA (US)

(72) Inventors: Paul G. Allen, Mercer Island, WA (US); Philip V. Bayly, St. Louis, MO (US); David L. Brody, St. Louis, MO (US); Alistair K. Chan, Bainbridge Island, WA (US); Jesse R. Cheatham, III, Seattle, WA (US); Hon Wah Chin, Palo Alto, CA (US); Richard G. Ellenbogen, Seattle, WA (US); Roderick A. Hyde, Redmond, WA (US); Muriel Y. Ishikawa, Livermore, CA (US); Jordin T. Kare, San Jose, CA (US); Eric C. Leuthardt, St. Louis, MO (US); Nathan P. Myhrvold, Medina, WA (US); Tony S. Pan, Bellevue, WA (US); Robert C. Petroski, Seattle, WA (US); Raul Radovitzky, Bedford, MA (US); Anthony V. Smith, Seattle, WA (US); Elizabeth A. Sweeney, Seattle, WA (US); Clarence T. Tegreene, Mercer Island, WA (US); Nicholas W. Touran, Seattle, WA (US); Charles Whitmer, North Bend, WA (US); Lowell L. Wood, Jr., Bellevue, WA (US); Victoria Y. H. Wood, Livermore, CA (US)

(73) Assignee: Elwha LLC, Bellevue, WA (US)

( * ) Notice: Subject to any disclaimer, the term of this patent is extended or adjusted under 35 U.S.C. 154(b) by 116 days.

(21) Appl. No.: 14/694,722

(22) Filed: Apr. 23, 2015

(65) Prior Publication Data

US 2016/0310819 A1    Oct. 27, 2016

(51) Int. Cl.
*A63F 9/24* (2006.01)
*A63F 13/00* (2014.01)
(Continued)

(52) U.S. Cl.
CPC .......... *A63B 71/0605* (2013.01); *G01S 13/72* (2013.01); *G01S 17/66* (2013.01);
(Continued)

(58) Field of Classification Search
CPC .... A63B 2024/0025; A63B 2024/0043; A63B 2024/0046; A63B 2024/0056;
(Continued)

(56) References Cited

U.S. PATENT DOCUMENTS 4,030,731 A * 6/1977 Delcayre ................ A63B 69/02
340/323 R
4,824,107 A * 4/1989 French ............... A63B 24/0021
273/454
(Continued)

*Primary Examiner* — Milap Shah
*Assistant Examiner* — Jason Pinheiro
(74) *Attorney, Agent, or Firm* — Foley & Lardner LLP

(57) ABSTRACT

A penalty allocation system includes a processing circuit configured to receive first data from a first player-worn sensor regarding a first player involved in an impact, receive second data from a second player-worn sensor regarding a second player involved in the impact, identify one of the first player and the second player as an at-fault player in connection with the impact based on the first data and the second data, and determine a penalty for the at-fault player based on the first data and the second data.

25 Claims, 5 Drawing Sheets

(51) Int. Cl.
  *G06F 17/00* (2006.01)
  *G06F 19/00* (2018.01)
  *A63B 71/06* (2006.01)
  *G01S 19/19* (2010.01)
  *G01S 19/51* (2010.01)
  *G01S 17/66* (2006.01)
  *G01S 13/72* (2006.01)
  *A63B 71/08* (2006.01)
  *A63B 24/00* (2006.01)
  *A63B 102/24* (2015.01)
  *A63B 102/14* (2015.01)

(52) U.S. Cl.
  CPC .............. *G01S 19/19* (2013.01); *G01S 19/51* (2013.01); *A63B 71/08* (2013.01); *A63B 2024/0037* (2013.01); *A63B 2071/068* (2013.01); *A63B 2102/14* (2015.10); *A63B 2102/24* (2015.10); *A63B 2220/12* (2013.01); *A63B 2220/13* (2013.01); *A63B 2220/14* (2013.01); *A63B 2220/20* (2013.01); *A63B 2220/30* (2013.01); *A63B 2220/40* (2013.01); *A63B 2220/53* (2013.01); *A63B 2220/56* (2013.01); *A63B 2220/801* (2013.01); *A63B 2220/803* (2013.01); *A63B 2225/20* (2013.01); *A63B 2225/50* (2013.01); *A63B 2225/54* (2013.01); *A63B 2243/0025* (2013.01); *A63B 2243/0066* (2013.01)

(58) Field of Classification Search
  CPC .......... A63B 2220/80; A63B 2220/833; A63B 2220/836; A63B 2220/89
  See application file for complete search history.

(56) References Cited

U.S. PATENT DOCUMENTS

| | | | |
|---|---|---|---|
| 6,575,837 B1* | 6/2003 | Weske | A63B 69/02 463/47.1 |
| 7,891,231 B2* | 2/2011 | Song | A63B 69/004 73/12.09 |
| 8,021,281 B2* | 9/2011 | Forsell | A63B 69/004 463/47.1 |
| 8,382,685 B2 | 2/2013 | Vaccarie et al. | |
| 8,696,422 B1* | 4/2014 | Santiago | A63B 69/26 273/455 |
| 8,876,613 B2* | 11/2014 | Florea | A63B 69/02 463/47.1 |
| 2001/0023218 A1* | 9/2001 | Marciano | A63B 71/10 482/12 |
| 2001/0039354 A1 | 11/2001 | Mikami et al. | |
| 2002/0032101 A1* | 3/2002 | Riggs | A63B 71/0605 482/1 |
| 2005/0177929 A1* | 8/2005 | Greenwald | A42B 3/046 2/425 |
| 2006/0100022 A1* | 5/2006 | Linsay | A63B 69/02 463/47.1 |
| 2008/0083054 A1 | 4/2008 | Vaccari et al. | |
| 2012/0010002 A1* | 1/2012 | Hart | A63B 69/02 463/47.1 |
| 2012/0150453 A1 | 6/2012 | Benzel et al. | |
| 2012/0223833 A1 | 9/2012 | Thomas et al. | |
| 2014/0159922 A1* | 6/2014 | Maliszewski | A42B 3/046 340/870.16 |
| 2014/0343701 A1* | 11/2014 | Song | A63B 71/06 700/92 |

* cited by examiner

SYSTEMS AND METHODS FOR DETERMINING PENALTIES

BACKGROUND

Sporting contests such as football games often involve referees or other officials. The referees generally monitor player conduct to ensure player compliance with various rules of play, and may issue penalties to players for conduct violating one of the rules of play. For example, during a football game, a referee may issue a penalty to a player for an illegal hit (e.g., a hit to a player's head, a player's back side, etc.). Sport leagues may further penalize players for conduct during sporting contests in the form of fines, suspensions, and the like.

SUMMARY

One embodiment relates to a penalty allocation system. The penalty allocation system includes a processing circuit configured to receive first data from a first player-worn sensor regarding a first player involved in an impact, receive second data from a second player-worn sensor regarding a second player involved in the impact, identify one of the first player and the second player as an at-fault player in connection with the impact based on the first data and the second data, and determine a penalty for the at-fault player based on the first data and the second data.

Another embodiment relates to a penalty allocation system. The penalty allocation system includes a sensor system configured to acquire impact data for an impact between a first player and a second player and a processing circuit configured to receive the impact data, identify one of the first player and the second player as an at-fault player in connection with the impact based on the impact data, and determine a penalty for the at-fault player based on the impact data.

Another embodiment relates to a penalty allocation system. The penalty allocation system includes a first equipment configured to be worn by a first player and including a signal-carrying material configured to carry a signal, a second equipment configured to be worn by a second player and including a sensor configured to acquire signal data regarding the signal based on the second equipment impacting the first equipment, and a processing circuit configured to identify an at-fault player from an impact between the first player and the second player based on the signal data, and determine a penalty for the at-fault player based on the signal data.

Another embodiment relates to a method for allocating a penalty. The method includes receiving first data from a first player-worn sensor regarding a first player involved in an impact by a processing circuit, receiving second data from a second player-worn sensor regarding a second player involved in the impact by the processing circuit, identifying one of the first player and the second player as an at-fault player in connection with the impact by the processing circuit, and determining a penalty for the at-fault player based on the first data and the second data by the processing circuit.

Another embodiment relates to a method for allocating a penalty. The method includes acquiring impact data for an impact between a first player and a second player by a sensor system, receiving the impact data by a processing circuit, identifying one of the first player and the second player as an at-fault player in connection with the impact based on the impact data by the processing circuit, and determining a penalty for the at-fault player based on the impact data by the processing circuit.

Another embodiment relates to a method for allocating a penalty. The method including passing a signal through a first equipment configured to be worn by a first player, acquiring signal data with a second equipment including a second player-worn sensor configured to be worn by a second player regarding the signal based on the second equipment impacting the first equipment, identifying an at-fault player from an impact between the first player and the second player based on the signal data by a processing circuit, and determining a penalty for the at-fault player based on the signal data by the processing circuit.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
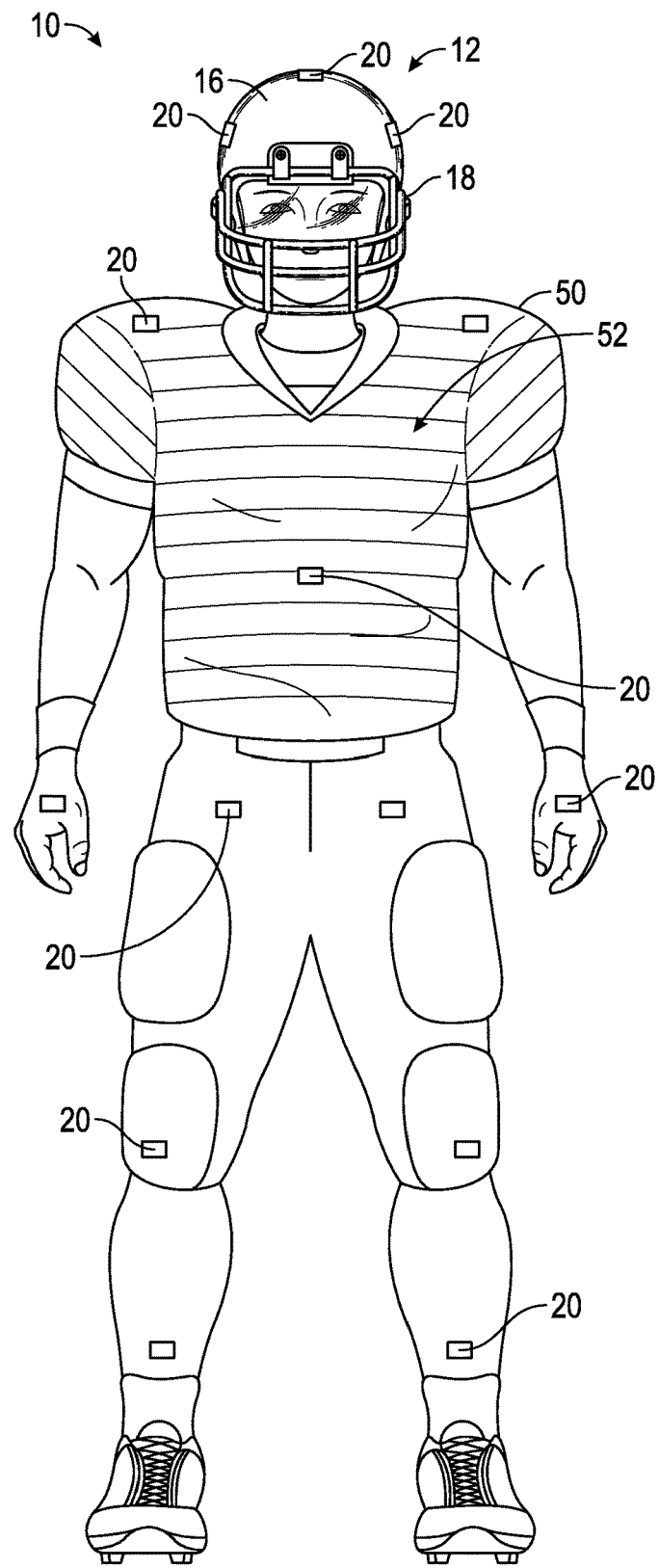
FIG. 1 is a front view of local equipment worn by a user, according to one embodiment.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to the Figures generally, various embodiments disclosed herein relate to a penalty allocation system configured to analyze impacts (e.g., collisions between two or more players, etc.) and objectively determine penalties for an at-fault player involved in the collision. In one embodiment, the penalty allocation system uses player-worn sensors to automatically determine the magnitude of an impact between two or more players. The penalty allocation system then determines which player is at fault, such that real-time imposition of penalties (e.g., suspensions, fines, flags, loss of yards, etc.) may be administered by officials (e.g., referees, umpires, league administration, etc.) based on quantitative and impartial data regarding the severity of the impact. In another embodiment, the uniforms worn by the players may generate a signal specific to the player wearing the uniform such that during a collision, the player-worn sensors are able to determine who is involved in the collision and the location of the impact (e.g., head, back, leg, etc.) on one or more players. The signal data is used to determine who the at-fault player in the collision is.

Figure 2:
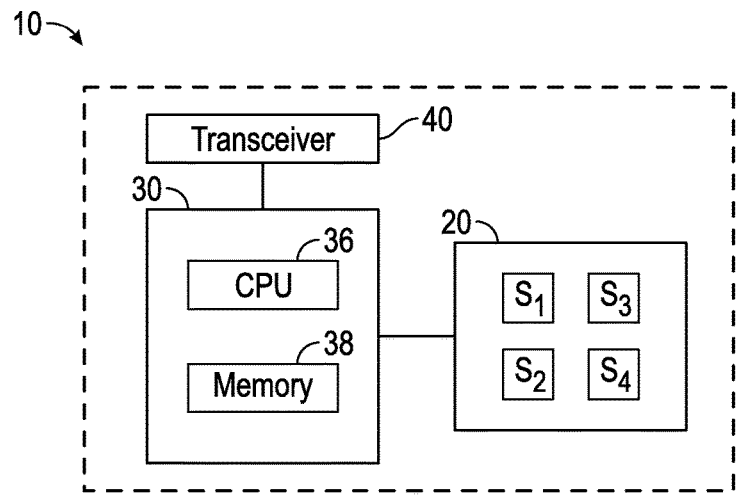
FIG. 2 is a schematic diagram of the local equipment of FIG. 1, according to one embodiment.

Referring to FIGS. 1-2, local equipment 10 is shown according to one embodiment. As shown in FIG. 1, local equipment 10 is wearable by a user (e.g., a player, a sports athlete, etc.) while performing various activities, including playing sports (e.g., football, hockey, lacrosse, motocross, etc.), in which contact (e.g., collisions, impacts, etc.) between two or more users of local equipment 10 may occur to determine impact characteristics (e.g., magnitude of impact, users involved in the impact, etc.). Local equipment 10 includes helmet 12 (e.g., a head protection device or member, a first or upper protection device or member, etc.), local sensor array 20, and uniform 50. By way of example, local equipment 10 may also include a torso protection assembly (e.g., a shoulder pad assembly, a second or lower protection device or assembly, etc.).

In the example embodiment, helmet 12 is a football helmet (e.g., used to protect a football player's head during a game or practice, etc.). In other embodiments, helmet 12 may be any helmet used to protect a user from impacts to the head (e.g., during activities such as motocross, snowboarding, hockey, lacrosse, snowmobiling, etc.). Helmet 12 includes helmet shell 16 and facemask 18. Helmet shell 16 may be structured as any type of helmet shell (e.g., football, baseball, hockey, motocross, etc.) used to protect a user's head. Facemask 18 may be any type of helmet facemask configured to protect the user's face. In some embodiments, facemask 18 includes one or more crossbars, a transparent shield, or other protection devices. In yet further embodiments, facemask 18 is rigidly attached to helmet shell 16, forming a single continuous unitary outer shell (e.g., a motocross helmet, etc.), or removably attached (i.e., detachable) to helmet shell 16 (e.g., a hockey helmet, a football helmet, etc.). In yet further embodiments, facemask 18 is omitted (e.g., a baseball helmet, etc.).

Local sensor array 20 may be or include one or more devices (e.g., player-worn sensors, tracking devices, etc.) configured to acquire data (e.g., user data, impact data, etc.) regarding the user (e.g., a player, etc.) of local equipment 10. By way of example, the data may include at least one of user data (e.g., data prior to an impact, etc.) and impact data (e.g., data during an impact, after an impact, etc.). User data may include an acceleration, a velocity, a location, a position, an orientation, and/or other data regarding the position and/or motion of the user of local equipment 10 during movement and/or prior to an impact with one or more other players or objects (e.g., other users of local equipment 10, etc.). In one embodiment, user data may include an identity of the user, a player role of the user (e.g., a pitcher in baseball, a quarterback or a receiver in football, a goalie in ice hockey or soccer, etc.), or a team affiliation of the user. In one embodiment, user data may include a position of the user within a field of play, such as relative to a border, relative to a line of scrimmage in football, relative to a basepath or foul line in baseball, relative to a red line, a blue line, or a goal line in ice hockey, relative to a goal line or a penalty line in soccer, or the like. In one embodiment, user data may include a time indication, such as a current time, a time at the start of a play (e.g., hiking of a ball in football, etc.), a time at a pause or end of play (e.g., end-of-play whistle, the two minute warning in football, etc.), or the like. In one embodiment, the user data may include an acceleration, a velocity, a location, an orientation, an identification of the impacting player or body part (e.g., a second player, a third player, an arm, a helmet, etc.), and/or other data regarding the position and/or motion of a another user of local equipment 10 prior to an impact with the first user of local equipment 10. Impact data may include a magnitude of an impact (e.g., force, torque, acceleration, impulse, etc.), a location of the impact on the user of local equipment 10 (e.g., head, back, torso, leg, etc.), and/or other impact characteristics regarding an impact between the user of local equipment 10 and one or more other players (e.g., other users of local equipment 10, etc.). As shown in FIG. 1, devices (e.g., sensors, etc.) of local sensor array 20 may be positioned at various locations on the body of the user of local equipment 10 (e.g., arms, hands, wrists, legs, feet, torso, etc.). In some embodiments, the devices of local sensor array 20 may be disposed about helmet 12 and/or uniform 50.

In one embodiment, local sensor array 20 may include inertial navigation devices (e.g., such as an inertial navigation system (INS) including accelerometers and/or gyroscopes, etc.). An inertial navigation system is a navigation aid that uses a processor/computer, motion sensors (e.g., accelerometers, etc.), and rotation sensors (e.g., gyroscopes, etc.) to continuously or periodically calculate user data (e.g., the position, orientation, velocity, and/or acceleration of an object, etc.) in regards to the user of local equipment 10, without the need for external references.

In another embodiment, one or more devices of local sensor array 20 may include a probe beam device. The probe beam device may include at least one of a radar device, a sonar device, and a lidar device. In other embodiments, one or more devices of local sensor array 20 may include a radio-frequency identification (RFID) reader configured to receive signals from RFID tags located on local equipment 10 worn by one or more players. By way of example, the one or more devices of local sensor array 20 may be configured to measure relative range (e.g., separation distance between two or more users of local equipment 10, etc.), relative velocity, and/or direction of travel of other players (e.g., user data, etc.) prior to a collision.

According to an example embodiment, local sensor array 20 may determine the position and orientation of various body parts of the user and/or protective equipment (e.g., helmet 12, etc.). The orientation of the various body parts may include an orientation of a head, a torso, an arm, a leg, and/or any other body part deemed substantially significant to track. In one embodiment, one device of local sensor array 20 may act as a master device (e.g., reference location, etc.) and the other devices of local sensor array 20 may provide their position and/or orientation relative to the master device. In other embodiments, each device may determine the position and orientation of its respective body part independent of the other devices of local sensor array 20. A human body model may be used to predict the location of other body parts (e.g., body parts without a tracking device, etc.) based on the measurements (e.g., position, orientation, etc.) at each of the one or more devices of local sensor array 20. The position and orientation of various body parts of the user of local equipment 10 may be useful in determining who is involved in an impact.

In one embodiment, the one or more devices of local sensor array 20 are configured to determine impact data regarding the user of local equipment 10 and one or more other users of local equipment 10 (e.g., a second user, a second player, a third user, etc.). Local sensor array 20 may include an accelerometer, a pressure sensor, a force sensor, a proximity sensor, a strain sensor, an array of one of the aforementioned sensors, or an array of a combination thereof disposed about various location of local equipment 10 to determine the impact data such that the strength of the impact (e.g., magnitude of force, acceleration, etc.), the location of the impact on the player (e.g., first user, etc.), the location of the impact on the second player, and/or other impact characteristics. In some embodiments, local sensor array 20 may include a camera device configured to monitor the surrounding area (e.g., field, area of play, vicinity of the wearer, etc.) and aid in the determination of which players are involved in an impact. In some embodiments, the camera device may comprise a stereoscopic camera configured to determine range information.

As shown in FIG. 2, local equipment 10 includes local processing circuit 30. Local processing circuit 30 may be worn by a user, or may be external to a user and communicatively coupled (e.g., by a wireless communications channel, etc.) to the user. Local processing circuit 30 includes local processor 36 and local memory 38. Local processor 36 may be implemented as a general-purpose processor, an application specific integrated circuit (ASIC), one or more field programmable gate arrays (FPGAs), a digital-signal-processor (DSP), a group of processing components, or other suitable electronic processing components. Local memory 38 is one or more devices (e.g., RAM, ROM, Flash Memory, hard disk storage, etc.) for storing data and/or computer code for facilitating the various processes described herein. Local memory 38 may be or include non-transient volatile memory or non-volatile memory. Local memory 38 may include database components, object code components, script components, or any other type of information structure for supporting the various activities and information structures described herein. Local memory 38 may be communicably connected to local processor 36 and provide computer code or instructions to local processor 36 for executing the processes described herein.

Referring still to FIG. 2, local sensor array 20 is communicably coupled to local processing circuit 30, such that information (e.g., user data, impact data, etc.) may be exchanged between local processing circuit 30 and local sensor array 20. The devices of local sensor array 20 (e.g., accelerometers, gyroscopes, etc.) are communicably coupled with local processing circuit 30, more specifically local processor 36. As such, local processor 36 receives data specific to the user of local equipment 10. In one embodiment, at least one of the user data and the impact data are stored within local memory 38. In other embodiments, at least one of the user data and the impact data are transferred to transceiver 40.

As shown in FIG. 2, local processing circuit 30 is also communicably coupled to transceiver 40, such that information/data (e.g., user data, impact data, etc.) may be exchanged between local processing circuit 30 and transceiver 40. Transceiver 40 may receive the user data and/or the impact data directly from local processor 36 or access the data from local memory 38. In one embodiment, transceiver 40 sends at least one of the user data and the impact data of the user to an external system (e.g., a remote server, a penalty assessment system, etc.), as is described more fully herein. In another embodiment, transceiver 40 may send and receive the user data and the impact data to and from one or more other local equipment 10. In some embodiment, transceiver 40 includes a global positioning system (GPS) receiver configured to receive absolute location data (e.g., absolute position measurements, etc.) of each of the players to further aid in the determination of which players are involved in a collision.

Figure 3:
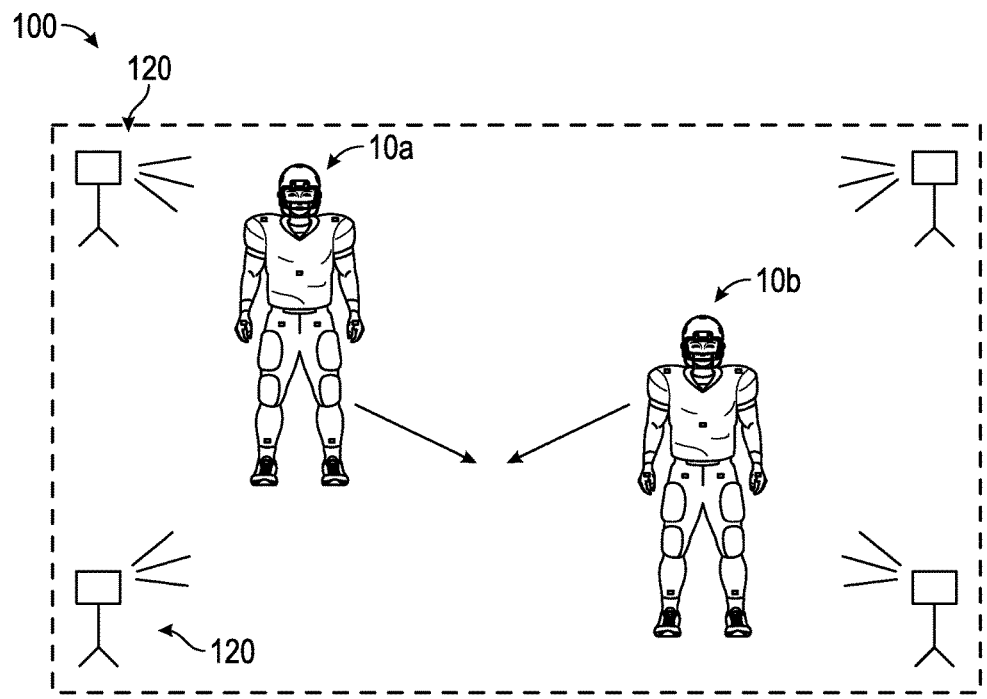
FIG. 3 is an illustration of a penalty allocation system with an external sensor system and local equipment, according to one embodiment.
Figure 4:
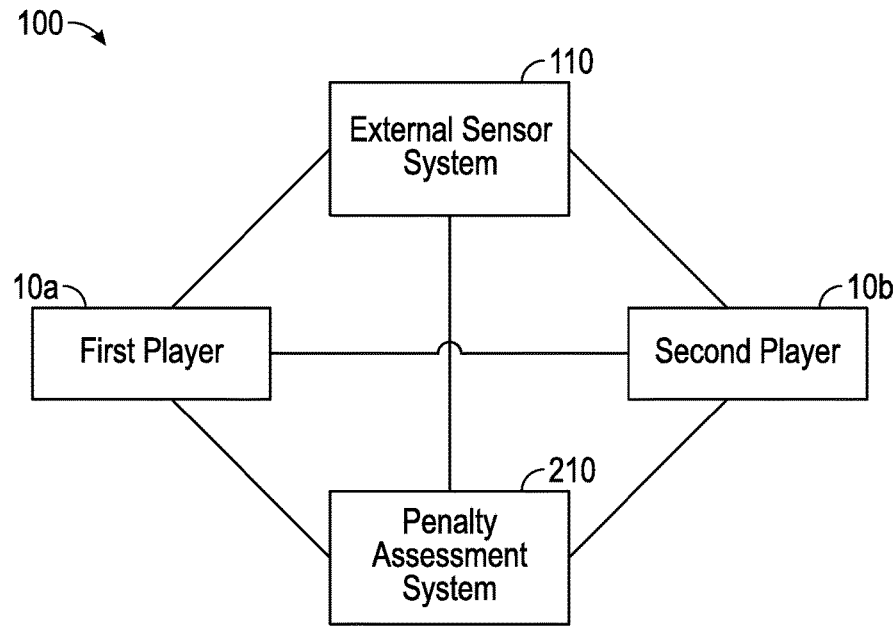
FIG. 4 is a schematic diagram of the penalty allocation system of FIG. 3, according to one embodiment.
Figure 5:
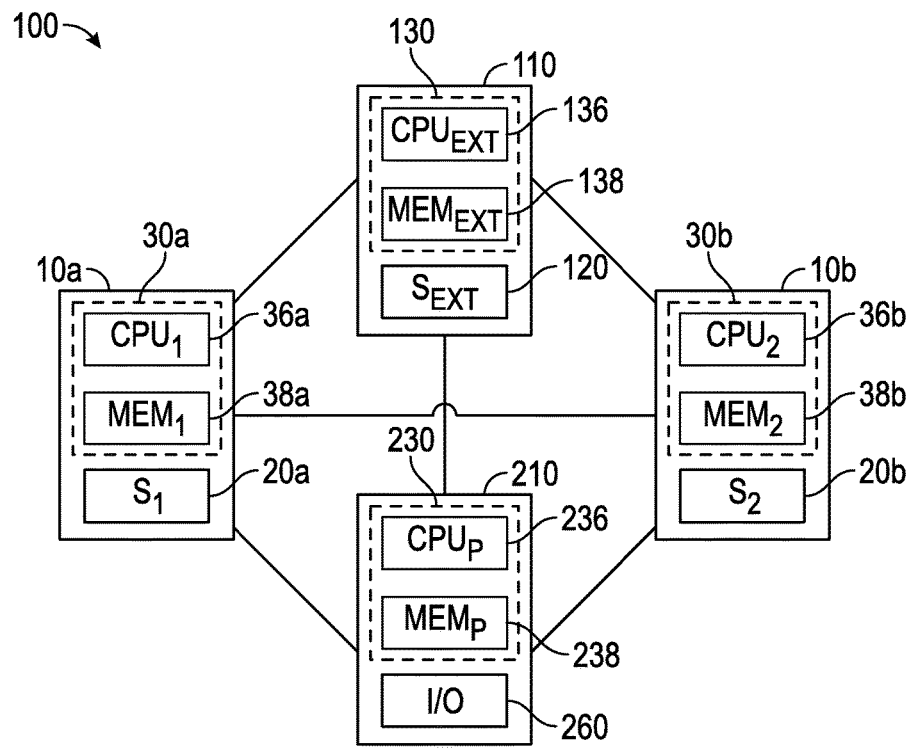
FIG. 5 is a detailed schematic diagram of the penalty allocation system of FIG. 3, according to one embodiment.

Referring now to FIGS. 3-5, a penalty allocation system, shown as penalty allocation system 100, is shown according to one embodiment. As shown in FIGS. 3-5, penalty allocation system 100 includes first local equipment 10*a* worn by a first player and second local equipment 10*b* worn by a second player. In an alternative embodiment, penalty allocation system 100 includes first local equipment 10*a* worn by a first player, which is also configured (e.g., via use of a camera, radar, lidar, etc.) to acquire user data or impact data regarding a second player. In one embodiment, penalty allocation system 100 includes a plurality of players (e.g., three, four, five, etc.) wearing local equipment 10. As shown in FIGS. 4-5, penalty allocation system 100 includes external sensor system 110 and penalty assessment system 210. As shown in FIGS. 3 and 5, external sensor system 110 includes external sensor array 120 and external processing circuit 130. External sensor array 120 may be or include one or more devices (e.g., external sensors, remote sensors, tracking devices, etc.) configured to acquire external sensor data in order to continuously or periodically determine the identity, location, position, orientation, velocity, and/or acceleration of each of a plurality of players (e.g., first local equipment 10*a* worn by the first player, second local equipment 10*b* worn by the second player, etc.). The one or more devices of external sensor array 120 may include a camera device, a radar device, a lidar device, an RF receiver, a global positioning system, and/or any other device to acquire data regarding the location and/or movement of each of the plurality of players. In some embodiments, external sensor system 110 includes a clock/timer device. In one embodiment, external sensor data may include a position of the user within a field of play, such as relative to a border, relative to a line of scrimmage in football, relative to a basepath or foul line in baseball, relative to a red line, a blue line, or a goal line in ice hockey, relative to a goal line or a penalty line in soccer, or the like. In one embodiment, external sensor data may include a time indication, such as a current time, a time at the start of a play (e.g., hiking of a ball in football, etc.), a time at a pause or end of play (e.g., end-of-play whistle, the two minute warning in football, etc.), or the like.

As shown in FIG. 5, external processing circuit 130 includes external processor 136 and external memory 138. External processor 136 may be implemented as a general-purpose processor, an application specific integrated circuit (ASIC), one or more field programmable gate arrays (FPGAs), a digital-signal-processor (DSP), a group of processing components, or other suitable electronic processing components. External memory 138 is one or more devices (e.g., RAM, ROM, Flash Memory, hard disk storage, etc.) for storing data and/or computer code for facilitating the various processes described herein. External memory 138 may be or include non-transient volatile memory or non-volatile memory. External memory 138 may include database components, object code components, script components, or any other type of information structure for supporting the various activities and information structures described herein. External memory 138 may be communicably connected to external processor 136 and provide computer code or instructions to external processor 136 for executing the processes described herein.

Referring still to FIG. 5, penalty assessment system 210 includes penalty processing circuit 230 and input/output (I/O) device 260. Penalty processing circuit 230 includes penalty processor 236 and penalty memory 238. Penalty processor 236 may be implemented as a general-purpose processor, an application specific integrated circuit (ASIC), one or more field programmable gate arrays (FPGAs), a digital-signal-processor (DSP), a group of processing components, or other suitable electronic processing components. Penalty memory 238 is one or more devices (e.g., RAM, ROM, Flash Memory, hard disk storage, etc.) for storing data and/or computer code for facilitating the various processes described herein. Penalty memory 238 may be or include non-transient volatile memory or non-volatile memory. Penalty memory 238 may include database components, object code components, script components, or any other type of information structure for supporting the various activities and information structures described herein. Penalty memory 238 may be communicably connected to penalty processor 236 and provide computer code or instructions to penalty processor 236 for executing the processes described herein.

In one embodiment, I/O device 260 is communicably coupled to penalty processing circuit 230, such that information may be exchanged between penalty processing circuit 230 and I/O device 260, wherein the information may relate to one or more impacts between a plurality of players. I/O device 260 enables an operator of penalty allocation system 100 to communicate with penalty processing circuit 230 and one or more other devices (e.g., first local equipment 10*a*, second local equipment 10*b*, external sensor system 110, etc.). In some embodiments, I/O device 260 may include, but is not limited to, an interactive display, a touchscreen device, one or more buttons and switches, voice command receivers, etc. In other embodiments, I/O device 260 includes a remote device such as a laptop computer, a tablet computer, a desktop computer, a phone, a watch, a personal digital assistant, etc.

Referring again to FIGS. 3-5, penalty allocation system 100 is configured to receive or acquire and analyze data (e.g., impact data, external data, user data, etc.) regarding an impact between two or more players to objectively determine an at-fault player in connection with the impact. The penalty allocation system 100 is configured to identify the at-fault player based on a location of the impact (e.g., side, rear, or top of helmet 12, back or side of torso, etc.) on at least one of the players (e.g., first player, second player, etc.), an acceleration of at least one of the players towards the impact and/or after the impact, a direction of motion of at least one of the players towards the impact, a position of a body portion (e.g., head direction, leg location, arm position, etc.) of at least one of the players, and/or other determining characteristics. After identifying the at-fault player, a penalty (e.g., a fine, a suspension, a card, a flag, a loss of yards, etc.) is determined and administered to the at-fault player (or team of the at-fault player) by an official (e.g., referee, umpire, league administration, etc.) based on predefined criteria. The predefined criteria may include a magnitude for the impact (e.g., force, torque, acceleration, impulse, etc.), an impacted portion (e.g., head, etc.) of at least one of the players (e.g., first player, second player, at-fault player, etc.) involved in the impact, a level of an induced head acceleration, and/or other criteria. The predefined criteria may be based on an identity of the at-fault player, e.g., a player with multiple previous or recent at-fault determinations may receive a more severe penalty than an at-fault player with fewer previous penalties. The predefined criteria may be based on the role of one or both of the players, e.g., impacting a "protected" player (e.g., a quarterback, kicker, goalie, a player with a concussion history, etc.) may incur a stiffer penalty than impacting a lineman. The predefined criteria may be based on time or position/location, e.g., collisions may be more "permissible" during the first 3 seconds of a football play, or near the line of scrimmage, or collisions may be dealt with more severely near a goal or the like. The predefined criteria may be based on team affiliation, e.g., a player may not be penalized for collisions with a teammate.

According to an example embodiment, first local equipment 10*a*, second local equipment 10*b*, external sensor system 110, and penalty assessment system 210 are communicably coupled (e.g., such that information may be transmitted between them, etc.). In one embodiment, penalty processing circuit 230 is configured to receive first data (e.g., first user data, first impact data, etc.) from first local equipment 10*a* and second data (e.g., second user data, second impact data, etc.) from second local equipment 10*b* regarding the first and second players involved in an impact. The first and second data may be compared to determine the magnitude of the impact, location of the impact, and other impact characteristics. In other embodiments, penalty processing circuit 230 is configured to receive a plurality of data (e.g., first data, second data, third data, etc.) regarding a plurality of players involved in an impact. In one embodiment, penalty processing circuit 230 issues a penalty to the at-fault player based on the impact characteristics exceeding the predefined criteria. The penalty may be communicated to a remote device of I/O device 260 to notify an official. In some embodiments, penalty processing circuit 230 issues a warning to the players involved in the collision and/or to the official(s) when the impact characteristics are within a designated range, but do not exceed the predefined criteria. The local and/or external cameras may provide officials with the opportunity to review questionable collisions (e.g., impacts with issued warnings, etc.) to determine if further action should be taken (e.g., issuance of fines, penalties, suspensions, etc.).

In another embodiment, penalty processing circuit 230 may identify a discrepancy between the first data and the second data regarding the impact. For example, one of the local sensor arrays 20 (e.g., first local sensor array 20*a*, second local sensor array 20*b*, etc.) may be miscalibrated or experiencing sensor drift causing the local sensor array 20 to measure incorrect (e.g., inaccurate, imprecise, etc.) data. In this case, penalty processing circuit 230 may receive external sensor data from external sensor system 110. By way of example, penalty processing circuit 230 may compare the first data and the second data to the external sensor data. Penalty processing circuit 230 may then determine the penalty based on the comparison of the first data and the second data to the external senor data (e.g., to negate the discrepancy, overcome the discrepancy, etc.). In other embodiments, penalty allocation system 100 may use the first data, the second data, and the external sensor data (or any combination thereof) to determine and issue a penalty to the at-fault player without a discrepancy being present between the first and second data.

In still another embodiment, penalty allocation system 100 is configured to determine if an impact occurs outside of the area of play and/or after play is suspended (e.g., after a whistle, etc.). For example, in football, a player may be hit unnecessarily after stepping out of bounds, after scoring a touchdown, or after a play has been whistled dead. Using external sensor system 110 and/or local equipment 10, penalty allocation system 100 may be able to determine late hits and other unsportsmanlike conduct, such that penalties may be given to the at-fault player or team.

Figure 6:
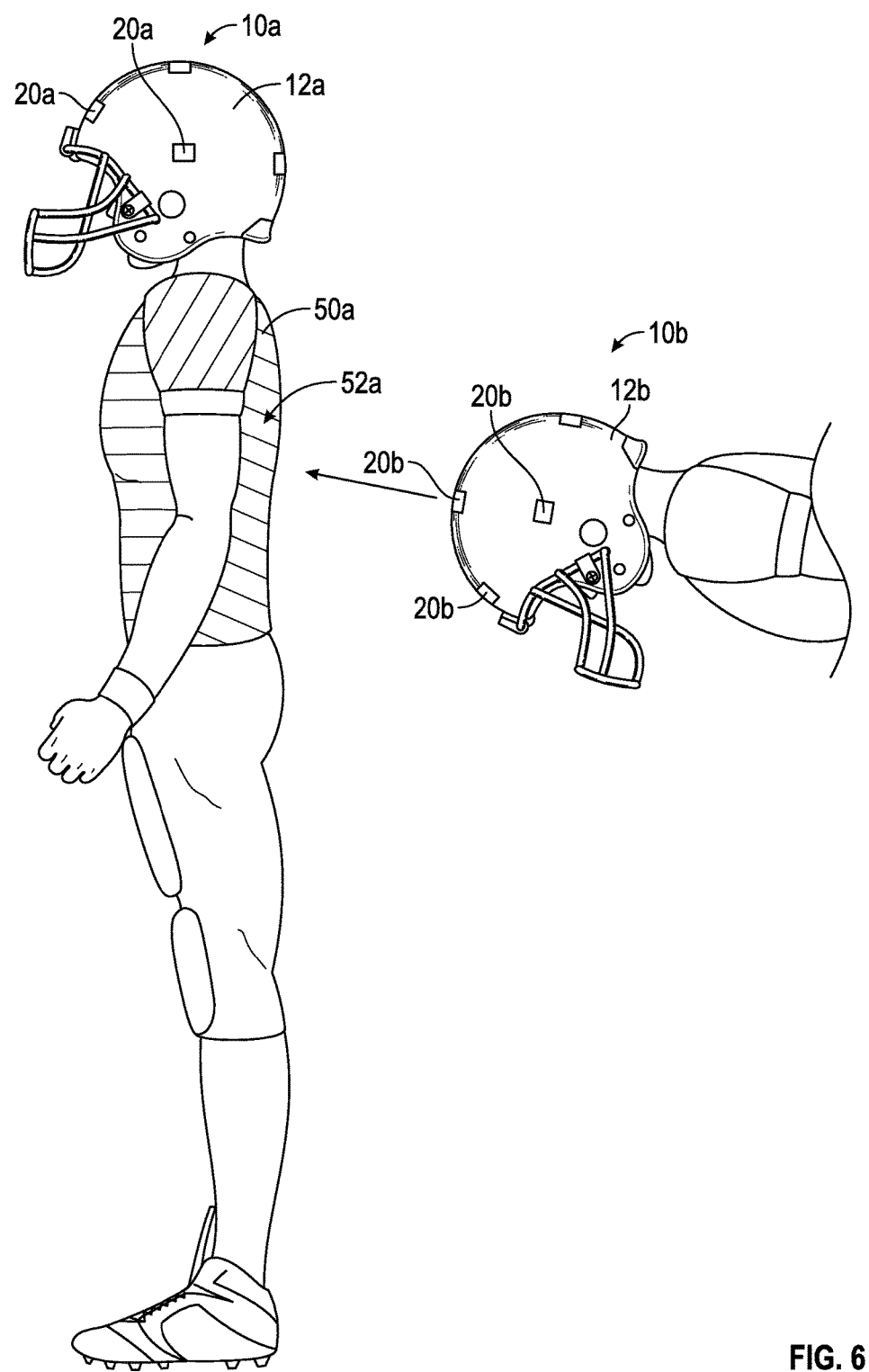
FIG. 6 is an illustration of a collision between two users of local equipment including encoded signal, according to one embodiment.

Referring now to FIGS. 1 and 6, uniform 50 of local equipment 10 includes a signal-carrying material, shown as conductive mesh 52, disposed within the fabric of uniform 50. In one embodiment, conductive mesh 52 includes conformable electronics. In another embodiment, conductive mesh 52 includes electronic thread. In one embodiment, the conductive mesh 52 is configured to generate and carry a signal (e.g., electrical signal, ultrasound signal, etc.) encoded with signal data including identification characteristics or other information. In an alternative embodiment, the signal is generated by a different source (e.g., not the conductive mesh 52, etc.). In other embodiments, the generated signal travels through a different component of local equipment 10 (e.g., helmet 12, torso protection assembly, etc.). The signal may be generated continuously, only during play, just before an impact, or during an impact. In one embodiment, the identification characteristics include an identification of the player wearing uniform 50. In some embodiments, the signal is encoded with differing identification characteristics based on the location on uniform 50 (e.g., back, stomach, shoulder, leg, etc.) to identify the location on the player (e.g., a body part, a body portion, etc.). In other embodiments, the signals at each location of uniform 50 are emitted at characteristic times (e.g., microsecond time slots, etc.), such that one location is distinguishable from other locations on the player.

As shown in FIG. 6, a first player is wearing first local equipment 10a and a second player is wearing second local equipment 10b. During a collision between the first player and the second player, the signal generated by first conductive mesh 52a is detected by second helmet 12b worn by the second player. More specifically, second local sensor array 20b acquires the signal data regarding the signal generated by first conductive mesh 52a based on the second local equipment 10b (i.e., the second payer, etc.) impacting the first local equipment 10a (i.e., the first player, etc.), according to one embodiment. By way of example, the sensors of second local sensor array 20b disposed about the other portions of the second player (e.g., legs, torso, arms, etc.) may also be configured to acquire the signal data. In other embodiments, second local sensor array 20b acquires the signal data regarding the signal generated by first conductive mesh 52a based on the second local equipment 10b being in close proximity (e.g., within ten centimeters, half a foot, etc.) to the first local equipment 10a.

According to an example embodiment, during a collision, second local sensor array 20b acquires a signal from first conductive mesh 52a, and second local processing circuit 30b and/or penalty processing circuit 230 determine the location of the impact site based on the signal being encoded with the differing identification characteristics based on the location on first uniform 50a. In another embodiment, second local sensor array 20b acquires a plurality of signals from discrete sources within first conductive mesh 52a. Second local processing circuit 30b and/or penalty processing circuit 230 determine the location of the impact site on the first player by comparing the signals from two or more discrete signal sources on first uniform 50a (e.g., based on the characteristic time slots, etc.). It should be noted that FIG. 6 is shown from the perspective of the second player impacting the first player. In other embodiments, it may be shown from the first player impacting the second player. In further embodiments, the impact may be between two or more players (e.g., three, four, five, etc.).

Determining which players are involved in the impact and the impact locations using the conductive mesh 52 may be used to supplement or take the place of the orientation and location data determined by local sensor array 20, as described in regards to FIGS. 1-5. The acquired signal data may be used to identify and determine an at-fault player from an impact between the two or more players. Penalty assessment system 210 of penalty allocation system 100 may determine a penalty for the at-fault player based on the signal data via penalty processing circuit 230. In turn, penalty processing circuit 230 issues a penalty (or warning) to the at-fault player based on the signal data. In one embodiment, penalty processing circuit 230 determines and issues the penalty based further on impact characteristics exceeding the predefined criteria, as described above.

In another embodiment, conductive mesh 52 is used to determine other violations. For example, in football, holding penalties may often be missed (e.g., official is looking elsewhere, etc.) or incorrectly penalized (e.g., subjective based on officials view point, tendencies, etc.). Conductive mesh 52 may provide an objective mechanism through which holding penalties may be objectively and correctly penalized whether or not the official sees the penalty (e.g., based on the location of contact, the length of contact, etc.).

In yet further embodiments, in addition to allocating penalties, penalty allocation system 100 may be configured to determine "good" hits and/or determine and/or reward players, etc. for such hits. In some embodiments, a good hit includes impacts where a player changes direction, speed, acceleration, or some other characteristic (e.g., impact location, etc.) to avoid a penalty. Such changes in movement may be tracked and identified using any of the sensor systems herein, such that efforts by players to avoid otherwise illegal or dangerous (e.g., potentially injury-causing) impacts, collisions, etc. may be rewarded. In addition to the above factors, good hits may be identified by a location of impact on one or more players involved in an impact, a magnitude of an impact, and the like. In some embodiments, predetermined thresholds of any of these factors may be stored and used to determine whether an impact or hit is considered a good hit. As such, in addition to allocating penalties for illegal actions, penalty allocation system 100 is in some embodiments further configured to reward players for safe/legal play. As an example, a player may be moving head first toward another player at a relatively high rate of speed, and change course or slow down prior to impacting the other player to avoid hitting the other player in the back, to avoid striking the other player with a helmet, to reduce a speed prior to impact, etc. Penalty allocation system 100, based on monitoring one or more such changes to the movement of the first player, may identify the impact as including a good hit by the player, and determine an appropriate award (e.g., a monetary award, a recognition award, etc.) to be provided to the player.

In some embodiments, penalty allocation system 100 may be configured to identify a recipient of a penalty or a reward responsive to an impact between a first player and a second player (or any number of players) based on various data (e.g., impact data, user data, external data, signal data, etc.). The recipient may include the first player and/or the second player (or any number of players involved in the impact). Penalty allocation system 100 may then determine the penalty and/or the reward for the recipient(s) regarding the impact between the first player and the second player. Therefore, penalty allocation system 100 may penalize the first player, penalize the second player, reward the first player, reward the second player, or any combination thereof (e.g., penalize both players, reward both players, penalize one player and reward the other player, etc.).

Figure 7:
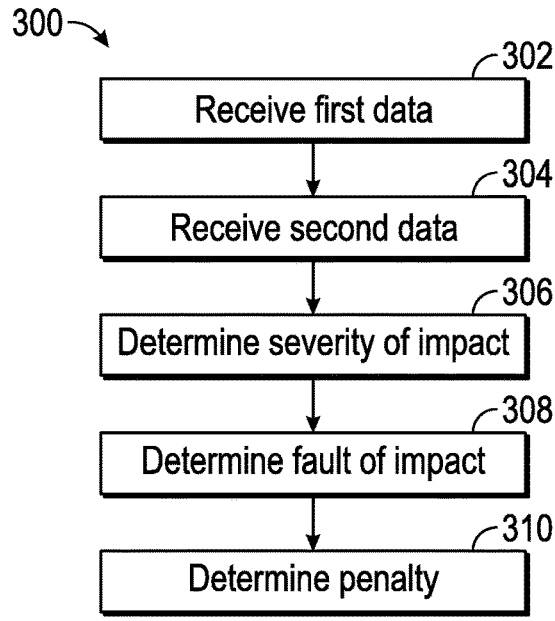
FIG. 7 is a block diagram of a method of allocating a penalty, according to one embodiment.

Referring now to FIG. 7, method 300 of allocating a penalty is shown according to an example embodiment. In one example embodiment, method 300 may be implemented with local equipment 10 and penalty allocation system 100 of FIGS. 1-5. Accordingly, method 300 may be described in regard to FIGS. 1-5.

At 302, a processing circuit (e.g., penalty processing circuit 230, etc.) receives first data. For example, first local sensor array 20a acquires first data including at least one of first user data and first impact data regarding an impact between the first player and a second player. The first data may be stored in penalty memory 238 of penalty processing circuit 230 for future use by penalty processor 236. At 304, the processing circuit receives second data. For example, second local sensor array 20b acquires second data including at least one of second user data and second impact data regarding an impact between the second player and the first player. The second data may be stored in penalty memory 238 of penalty processing circuit 230 for future use by penalty processor 236. In one embodiment, the first data and the second data are received simultaneously (e.g., at substantially the same time, etc.). In other embodiments, the second data is received before the first data. In still another embodiment, penalty processing circuit 230 receives a plurality of data (e.g., first data, second data, third data, etc.).

At 306, the processing circuit determines a severity of the impact. For example, penalty processing circuit 230 may compare the first and second data to predefined criteria to determine whether the impact characteristics (e.g., a magnitude for the impact, an impacted portion of at least one of the players involved in the impact, a level of an induced head acceleration, etc.) defined by the first and second data exceed the predefined criteria. If the predefined criteria is exceeded, the processing circuit determines which player is at fault in the impact (408). At 310, the processing circuit determines a penalty for the at-fault player or team. For example, based on the severity of the impact, various penalties, suspensions, and/or fines may be objectively determined by penalty assessment system 210 for the official(s) to administer to the at-fault player. The determined penalty may then be sent to a remote device of I/O device 260 such that the officials may administer an objective penalty call (e.g., based on the acquired first and second data, etc.). In other embodiments, external sensor system 110 provides external sensor data to penalty assessment system 210. Penalty assessment system 210 may determine the penalty based further on a comparison of the first data, the second data, and/or the external data.

Method 300 is shown to encompass two players (e.g., wearing local equipment 10, etc.). In other embodiments, method 300 may involve a plurality of players (e.g., more than two, etc.) wearing local equipment 10 that communicate with penalty assessment system 210 (e.g., when two or more players impact each other concurrently, etc.) to determine an at-fault player in the collision and assign the appropriate penalty to the at-fault player (or team).

Figure 8:
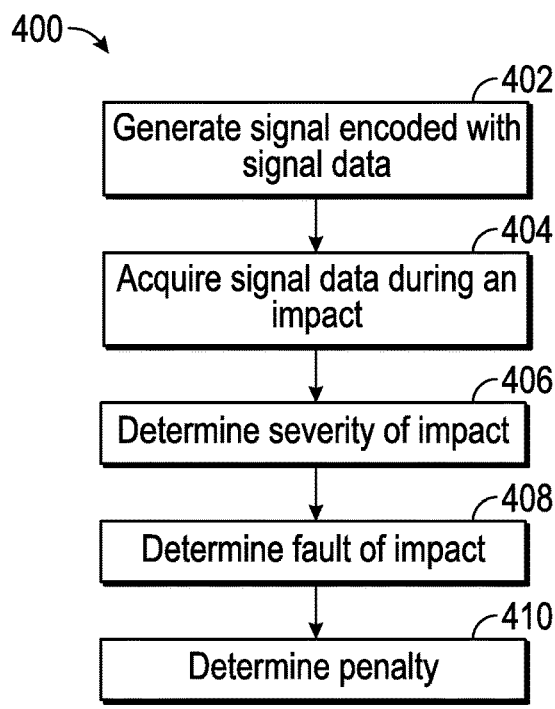
FIG. 8 is a block diagram of a method of allocating a penalty, according to another embodiment.

Referring now to FIG. 8, method 400 of allocating a penalty is shown according to another example embodiment. In one example embodiment, method 400 may be implemented with local equipment 10 and penalty allocation system 100 of FIGS. 1-6. Accordingly, method 400 may be described in regard to FIGS. 1-6.

At 402, a signal encoded with signal data is generated. For example, first conductive mesh 52a generates a signal throughout first uniform 50a that is encoded with signal data including identification characteristics. At 404, the signal data is acquired during an impact. For example, second local sensor array 20b receives the signal data during a collision between the first player and the second player such that the players involved in the collision are identified and the location of the impact on each player is identified.

At 406, the processing circuit determines a severity of the impact. For example, penalty processing circuit 230 may receive impact data regarding the impact between the first and second player from at least one of first local sensor array 20a, second local sensor array 20b, and external sensor array 120. Penalty processing circuit 230 may in turn compare the impact data to predefined criteria to determine whether the impact characteristics (e.g., a magnitude for the impact, an impacted portion of at least one of the players involved in the impact, a level of an induced head acceleration, etc.) defined by the impact data exceed the predefined criteria. If the predefined criteria is exceeded, the processing circuit determines which player is at fault in the impact (408) based on the signal data, as described above. At 410, the processing circuit determines a penalty for the at-fault player or team. For example, based on the severity of the impact, various penalties, suspensions, and/or fines may be determined by penalty assessment system 210 for the official(s) to administer to the at-fault player based on the severity of the impact. The determined penalty may then be sent to a remote device of I/O device 260 such that the officials may administer an objective penalty call (e.g., based on the acquired signal data and impact data, etc.).

Method 400 is shown to encompass two players (e.g., wearing local equipment 10, etc.). In other embodiments, method 400 may involve a plurality of players (e.g., more than two, etc.) wearing local equipment 10 that communicate with penalty assessment system 210 (e.g., when two or more players impact each other concurrently) to determine an at-fault player in the collision and assign the appropriate penalty to the at-fault player (or team).

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A penalty allocation system, comprising:
    a processing circuit configured to:
        receive first data from a first player-worn sensor regarding a first player involved in an impact with a second player;
        receive second data from a second player-worn sensor regarding the second player involved in the impact with the first player;
        determine the first player and the second player are on opposing teams based on the first data and the second data;
        identify one of the first player and the second player as an at-fault player in connection with the impact directly between the first player and the second player based on the first data and the second data in response to determining the first player and the second player are on opposing teams; and
        determine a penalty for the at-fault player based on the first data and the second data in response to determining the first player and the second player are on opposing teams.

2. The system of claim 1, wherein the processing circuit is configured to determine a magnitude of the impact based on at least one of the first data and the second data and determine the penalty for the at-fault player based further on the magnitude of the impact.

3. The system of claim 2, wherein the magnitude of the impact includes a magnitude of at least one of a force, an acceleration, an impulse, and a torque resulting from the impact.

4. The system of claim 1, wherein the first data includes at least one of an acceleration, a velocity, a position, and an orientation of the first player.

5. The system of claim 1, wherein the first data includes at least one of an identity, a player role, and a team affiliation of the first player.

6. The system of claim 1, wherein at least one of the first data includes an indication of a location of the impact on a body of the first player and the second data includes an indication of a location of the impact on a body the second player.

7. The system of claim 1, wherein the first data includes data regarding the first player prior to the impact.

8. The system of claim 1, wherein the processing circuit is configured to identify a discrepancy between the first data and the second data regarding the impact.

9. The system of claim 8, wherein the processing circuit is configured to:
    receive external sensor data from a remote sensor regarding the impact; and
    determine the penalty based further on the external sensor data and the discrepancy.

10. The system of claim 1, further comprising the first player-worn sensor and the second player-worn sensor, wherein at least one of the first player-worn sensor and the second player-worn sensor includes a camera.

11. The system of claim 1, further comprising the first player-worn sensor and the second player-worn sensor, wherein at least one of the first player-worn sensor and the second player-worn sensor includes a probe beam device.

12. The system of claim 11, wherein the probe beam device includes at least one of a radar device, a sonar device, and a lidar device.

13. The system of claim 1, further comprising the first player-worn sensor and the second player-worn sensor, wherein at least one of the first player-worn sensor and the second player-worn sensor includes a RFID reader.

14. The system of claim 1, further comprising the first player-worn sensor and the second player-worn sensor, wherein at least one of the first player-worn sensor and the second player-worn sensor includes at least one of an accelerometer, a pressure sensor, a force sensor, a proximity sensor, and a strain sensor.

15. The system of claim 1, wherein at least one of the first player-worn sensor and the second player-worn sensor includes an array of sensors including at least one of one or more accelerometers, one or more pressure sensors, one or more force sensors, one or more proximity sensors, and one or more strain sensors.

16. The system of claim 1, wherein the processing circuit is further configured to:
    receive external sensor data from a remote sensor regarding the impact between the first player and the second player, wherein the remote sensor is positioned remote from all players and the impact; and
    identify the at-fault player and determine the penalty based on the first data, the second data, and the external sensor data.

17. The system of claim 1, wherein the processing circuit is further configured to output an indication of the penalty thereby facilitating an official in administering the penalty based on the indication.

18. The system of claim 16, wherein the remote sensor includes at least one of a clock, a camera device, a radar device, a lidar device, a RF receiver, and a global positioning system.

19. A penalty allocation system, comprising:
    a sensor system including:
        local sensors positioned on one or more players, the local sensors configured to acquire local data regarding an impact between a first player and a second player; and
        an external sensor positioned remote from the first player, the second player, and the impact, the external sensor configured to acquire external data regarding the impact; and
    a processing circuit configured to:
        receive the local data and the external data, at least one of the local data and the external data including an indication of a location of the impact on a body of at least one of the first player and the second player;
        identify one of the first player and the second player as an at-fault player in connection with the impact based on at least one of the local data and the external data; and determine a penalty for the at-fault player based on the at least one of the local data and the external data.

20. The system of claim 19, wherein the processing circuit is configured to receive user data regarding at least one of the first player and the second player prior to the impact, and wherein the processing circuit is configured to determine the penalty at least partially on the user data.

21. The system of claim 20, wherein the user data includes at least one of an acceleration, a velocity, a position, and an orientation of the first player.

22. The system of claim 20, wherein the user data includes at least one of an identity, a player role, and a team affiliation of the first player.

23. The system of claim 20, wherein the processing circuit is configured to:
   compare the local data and the user data to the external data; and
   determine the penalty based further on the comparison of the local data and the user data to the external data.

24. The system of claim 19, wherein the processing circuit is configured to determine a magnitude of the impact based on the local data and determine the penalty for the at-fault player based further on the magnitude of the impact.

25. The system of claim 19, wherein the sensor system includes an array of sensors including at least one of one or more accelerometers, one or more pressure sensors, one or more force sensors, one or more proximity sensors, and one or more strain sensors.

* * * * *